United States Patent
Rigosi

(10) Patent No.: US 9,322,175 B2
(45) Date of Patent: Apr. 26, 2016

(54) MIXTURES OF BITUMEN AND POLYMER COMPOSITIONS

(75) Inventor: Gian Luigi Rigosi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 27 days.

(21) Appl. No.: 12/734,728

(22) PCT Filed: Oct. 22, 2008

(86) PCT No.: PCT/EP2008/064244
§ 371 (c)(1),
(2), (4) Date: May 19, 2010

(87) PCT Pub. No.: WO2009/068371
PCT Pub. Date: Jun. 4, 2009

(65) Prior Publication Data
US 2010/0273918 A1    Oct. 28, 2010

Related U.S. Application Data

(60) Provisional application No. 61/004,759, filed on Nov. 29, 2007.

(30) Foreign Application Priority Data

Nov. 27, 2007 (EP) ..................... 07121668

(51) Int. Cl.
C08L 95/00 (2006.01)
E04D 5/02 (2006.01)

(52) U.S. Cl.
CPC .. E04D 5/02 (2013.01); C08L 95/00 (2013.01)

(58) Field of Classification Search
CPC ..... C08L 23/22; C08L 23/16; C08L 2555/80; C08L 95/00; C08L 23/00; C08L 2666/06; E04D 5/02
USPC ............................... 524/68, 59, 62
See application file for complete search history.

(56) References Cited

U.S. PATENT DOCUMENTS

| | | | |
|---|---|---|---|
| 4,078,020 A * | 3/1978 | Rose et al. | ..................... 525/240 |
| 4,282,127 A | 8/1981 | Desgouilles | |
| 4,971,937 A | 11/1990 | Albizzati et al. | |
| 5,077,327 A | 12/1991 | Cecchin et al. | |
| 5,145,819 A | 9/1992 | Winter et al. | |
| 5,286,564 A | 2/1994 | Cecchin et al. | |
| 5,324,800 A | 6/1994 | Welborn, Jr. et al. | |
| 5,488,078 A * | 1/1996 | Shutt et al. | ....................... 524/71 |
| 5,539,067 A | 7/1996 | Parodi et al. | |
| 6,277,918 B1 * | 8/2001 | Collina et al. | ................. 525/191 |
| 6,306,996 B1 | 10/2001 | Cecchin et al. | |
| 6,583,202 B1 * | 6/2003 | Grube et al. | .................... 524/68 |
| 2004/0254313 A1 | 12/2004 | Vitale et al. | |
| 2004/0260040 A1 | 12/2004 | Resconi | |
| 2006/0155071 A1 | 7/2006 | Morini et al. | |
| 2007/0254989 A1 * | 11/2007 | Zanchetta et al. | ............... 524/59 |

FOREIGN PATENT DOCUMENTS

| | | |
|---|---|---|
| EP | 0361493 | 4/1990 |
| EP | 0416815 | 3/1991 |
| EP | 0420436 | 4/1991 |
| EP | 0 592852 | 4/1994 |
| EP | 592852 A1 * | 4/1994 |
| EP | 0643066 | 3/1995 |
| EP | 0671404 | 9/1995 |
| EP | 0728769 | 8/1996 |
| JP | S5540786 | 3/1980 |
| JP | 2000191854 | 7/2000 |
| WO | WO 91/04257 | 4/1991 |
| WO | WO 97/31065 | 8/1997 |
| WO | WO 98/54251 | 12/1998 |
| WO | WO 9854251 A1 * | 12/1998 |

* cited by examiner

Primary Examiner — Susannah Chung
Assistant Examiner — Josephine Chang

(57) ABSTRACT

A mixture comprising a bitumen (A), and a polymer composition (B) comprising the following components, all percent amounts being by weight: I) from 1 to 30% of a butene-1 polymer having a Melt Flow Rate (MFR), measured according to ASTM D 1238, at 190° C./2.16 kg, from 0.1 to 1000 g/10 min.; and II) from 70 to 99% of a heterophasic polyolefin composition comprising the following polymer fractions: a) 4-45% of a propylene homopolymer or copolymer; b) 0-20% of a of a copolymer fraction containing ethylene, insoluble in xylene at room temperature; c) 40-95% of a copolymer of ethylene with propylene and/or a $CH_2$=CHR α-olefin, where R is a $C_2$-$C_8$ alkyl radical, containing ethylene in a quantity lower than 40% and being soluble in xylene at room temperature.

5 Claims, No Drawings

MIXTURES OF BITUMEN AND POLYMER COMPOSITIONS

The present invention relates to mixtures comprising bitumen and polymer compositions. Polymer compositions are introduced in bitumen in order to modify its characteristics and make it more suitable for the use for which it is destined. In fact bitumens have various applications, such as the preparation of roofing or road paving materials.

Polymer compositions containing propylene-ethylene or propylene-ethylene-diene copolymers, that can be used to modify bitumen, are already known in the art.

Published European patent application EP-A-411627 describes polymer compositions developed to be used in roofing applications. Said polymer compositions comprise two fractions, one of which is made up of a propylene homopolymer, and the other of a propylene-ethylene copolymer.

According to said patent application, the polymer compositions with the best properties for the use in bituminous mixtures for roofing must have an intrinsic viscosity (I.V.) ranging from 0.5 to 1.5 dl/g for both the above mentioned polymer fractions.

Published European patent application EP-A-592852 describes mixtures of bitumen and polymer compositions containing:
A) 10-40 parts by weight of a propylene homopolymer or a random copolymer of propylene with up to 10% by weight of comonomer(s);
B) 0-20 parts by weight of a copolymer fraction containing over 55 wt % ethylene units, which is insoluble in xylene at room temperature;
C) 50-80 parts by weight of a copolymer fraction of ethylene with propylene or higher α-olefins, said copolymer fraction being soluble in xylene at room temperature, and having an intrinsic viscosity in tetrahydronaphthaline at 135° C. greater than 1.5 and up to 2.2 dl/g.

Such compositions achieve an improved set of properties, in particular flexibility at low temperature, resistance to penetration and softening, and ductility.

The polymer compositions used for the said purpose up to now, however, have not provided modified bitumens with a satisfactory balance of mechanical properties and low viscosity. In fact a serious problem presented by the bitumens containing the above mentioned polymer compositions is the high viscosity, which makes it difficult to achieve a homogeneous dispersion of the polymer composition in the mixture and to process the same.

Such problem becomes even more critical in the presence of fillers, which are typically added in the bituminous mixtures to be used in roofing applications.

It has now been found that the addition in the said mixtures of relatively low amounts of polybutene-1, with respect to the total weight of the polymer compositions, has the effect of reducing the viscosity of the mixtures without worsening the final mechanical properties, thus making it possible to prepare and process the mixtures with reduced energy consumption and processing times, and/or to add higher amounts of polymer composition with respect to the prior art.

Therefore, object of the present invention are mixtures comprising a bitumen (A), and a polymer composition (B) comprising the following components, all percent amounts being by weight:
I) from 1 to 30%, preferably from 2 to 15%, of a butene-1 polymer having a Melt Flow Rate (MFR), measured according to ASTM D1238, at 190° C./2.16 kg, from 0.1 to 1000 g/10 min., preferably from 0.1 to 100 g/10 min.; and
II) from 70 to 99%, preferably from 85 to 98%, of a heterophasic polyolefin composition comprising the following polymer fractions:
a) from 4 to 45%, preferably from 10 to 40%, of a propylene homopolymer, or a copolymer of propylene with ethylene or a $CH_2$=CHR α-olefin, where R is a $C_2$-$C_8$ alkyl radical, or a copolymer of propylene with ethylene and said $CH_2$=CHR α-olefin, said copolymers containing 85% or more of propylene, and having a fraction insoluble in xylene at room temperature greater than 80%;
b) from 0 to 20%, preferably from 0 to 15%, of a copolymer fraction containing ethylene, insoluble in xylene at room temperature, preferably a copolymer of ethylene with propylene or a $CH_2$=CHR α-olefin, where R is a $C_2$-$C_8$ alkyl radical, or a copolymer of ethylene with propylene and said α-olefin, said copolymers being insoluble in xylene at room temperature; and
c) from 40 to 95%, preferably from 50 to 75%, of a copolymer of ethylene with propylene or a $CH_2$=CHR α-olefin, where R is a $C_2$-$C_8$ alkyl radical, and optionally minor quantities of a diene, or a copolymer of ethylene with propylene and said α-olefin, and optionally minor quantities of a diene, said copolymers containing ethylene in a quantity lower than 40%, preferably from 20 to 38%, and being soluble in xylene at room temperature.

In the present description room temperature refers to a temperature around 25° C.

The amounts of components (I) and (II) are referred to the total weight of (I) and (II).

Examples of the said polymer composition (B) are disclosed in the published patent application WO98/54251.

In the said patent application, the use of such compositions for roofing materials is generically mentioned. However no mention is made of mixtures with bitumen and of the said effect in reducing the viscosity of the mixtures.

Useful bitumens (A) include solid, semi-solid or viscous distillation residues of the petroleum refinery process, consisting predominantly of high molecular weight hydrocarbons, the structure of which can be partially altered, for example by oxidation.

The butene-1 polymer adequate for the use in this invention as component (I) of the polymer composition (B) can be selected from the group consisting of:
(i) butene-1 homopolymers; and
(ii) copolymers of butene-1 and one or more comonomer(s) selected from ethylene, propylene and $CH_2$=CHR α-olefins, where R is a $C_3$-$C_8$ alkyl radical; and
(iii) combinations of (i) and (ii).

The copolymers (ii) and the combinations (iii) are preferred.

In particular, the copolymers of butene-1 with ethylene, or with propylene or with both ethylene and propylene, and combinations of such copolymers, optionally with a butene-1 homopolymer, are preferred.

Preferably, the amount of comonomer(s) in the copolymers (ii) is from 0.1 to 10% by weight, more preferably from 0.5 to 10% by weight, referred to the total weight of the copolymers.

From the above definitions it is evident that the term "copolymer" includes polymers containing more than one kind of comonomers.

Examples of the above mentioned $CH_2$=CHR α-olefins where R is a $C_3$-$C_8$ alkyl radical, that can be present in the butene-1 polymer (I) are pentene-1, 4-methyl-pentene-1, hexene-1, and octene-1.

Said butene-1 polymer is preferably a crystalline or semi-crystalline isotactic polymer with an isotactic index of at least 60%. Said isotactic index is determined both as mmmm pentads/total pentads using $^{13}$C-NMR and as quantity by weight of matter soluble in xylene at 0° C.

Said butene-1 polymer can be obtained using known processes and polymerization catalysts; for example, the polymerization of butene-1, optionally in the presence of the said comonomer(s), can be carried out using Ziegler-Natta catalysts.

As a way of example, in order to produce the butene-1 polymers described above one can use TiCl$_3$ based catalysts, and aluminum derivatives, such as aluminum halides for example, as cocatalysts, as well as the catalytic systems described for example in published European patent applications EP-A-45977 and EP-A-361494. Such catalytic systems can be the same as those hereinafter described for the production of the heterophasic composition (II).

The polymerization process can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is highly preferred.

Examples of the said butene-1 polymers and of processes for their preparation are disclosed in WO9945043, WO03099883 and in WO2004048424.

As disclosed for instance in WO03042258, the butene polymers can also be prepared by polymerization in the presence of catalysts obtained by contacting a metallocene compound with an alumoxane.

The preferred heterophasic compositions (II) are those wherein the intrinsic viscosity of the total fraction soluble in xylene at room temperature is from 1 to 6 dl/g.

In the mixture of the present invention it is preferable that fraction a) of the heterophasic composition (II) be a copolymer instead of a homopolymer. Preferably the propylene content in the copolymers of fraction a) is from 90 to 99% by weight.

The fraction insoluble in xylene at room temperature of the polymers of fraction a) preferably ranges from 85 to 99%, in particular from 90 to 99% in the case of homopolymers, and from 85 to 95% in the case of copolymers.

When fraction b) is present, it is preferable that it be present in quantities equal to or higher than 1.

Preferably the content of ethylene in fraction b) is at least 75% by weight, more preferably at least 80% by weight with respect to the total weight of b). Preferably the fraction b) is an essentially linear copolymer of ethylene with propylene, such as linear low density polyethylene (LLDPE).

Examples of the above mentioned CH$_2$=CHR α-olefins where R is a C$_2$-C$_8$ alkyl radical, present in heterophasic composition (II), are butene-1, pentene-1, 4-methyl-pentene-1, hexene-1, and octene-1.

Whenever present, the amount of diene in fraction c) of composition (II) is preferably from 1 to 10% by weight with respect to the total weight of fraction c). Examples of dienes are butadiene, 1,4-hexadiene, 1,5-hexadiene, and ethylidene-1-norbornene.

Examples of heterophasic compositions (II) are described in published European patent application EP-A-0472946, whose content is incorporated in this patent application for reference purposes.

The above mentioned heterophasic polyolefin composition (II) can be prepared by mixing fractions a), b), and c) in the fluid state, i.e., at temperatures greater than their softening or melting point, or, more preferably, by sequential polymerization in two or more stages in the presence of a highly stereospecific Ziegler-Natta catalyst. In particular the catalyst system used comprises (1) a solid catalyst component containing a titanium compound and an electron-donor compound supported on magnesium chloride, and (2) an Al-containing cocatalyst and optionally (3) an electron-donor compound (external donor).

The solid catalyst component (1) contains as electron-donor (internal donor) a compound generally selected among the ethers, ketones, lactones, compounds containing N, P and/or S atoms, and mono- and dicarboxylic acid esters.

Particularly suited among the said electron-donor compounds are phthalic acid esters and succinic acid esters.

Suitable succinic acid esters are represented by the formula (I):

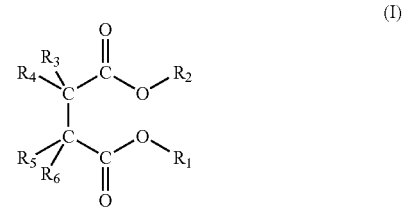

wherein the radicals R$_1$ and R$_2$, equal to or different from each other, are a C1-C20 linear or branched alkyl, alkenyl, cycloalkyl, aryl, arylalkyl or alkylaryl group, optionally containing heteroatoms; the radicals R$_3$ to R$_6$ equal to or different from each other, are hydrogen or a C1-C20 linear or branched alkyl, alkenyl, cycloalkyl, aryl, arylalkyl or alkylaryl group, optionally containing heteroatoms, and the radicals R$_3$ to R$_6$ which are joined to the same carbon atom can be linked together to form a cycle.

R$_1$ and R$_2$ are preferably C1-C8 alkyl, cycloalkyl, aryl, arylalkyl and alkylaryl groups. Particularly preferred are the compounds in which R$_1$ and R$_2$ are selected from primary alkyls and in particular branched primary alkyls. Examples of suitable R$_1$ and R$_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which R$_3$ to R$_5$ are hydrogen and R$_6$ is a branched alkyl, cycloalkyl, aryl, arylalkyl and alkylaryl radical having from 3 to 10 carbon atoms. Another preferred group of compounds within those of formula (I) is that in which at least two radicals from R$_3$ to R$_6$ are different from hydrogen and are selected from C1-C20 linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom.

Furthermore, also the compounds in which at least two radicals different from hydrogen are linked to different carbon atoms, that is R$_3$ and R$_5$ or R$_4$ and R$_6$ are particularly preferred.

Other electron-donors particularly suited are the 1,3-diethers, as illustrated in published European patent applications EP-A-361 493 and 728769.

As cocatalysts (2), one preferably uses the trialkyl aluminum compounds, such as Al-triethyl, Al-triisobutyl and Al-tri-n-butyl.

The electron-donor compounds (3) that can be used as external donors (added to the Al-containing compound) comprise the aromatic acid esters (such as alkylic benzoates), heterocyclic compounds (such as the 2,2,6,6-tetramethylpiperidine and the 2,6-diisopropylpiperidine), and in particular silicon compounds containing at least one Si—OR bond (where R is a hydrocarbon radical). The previously said 1,3-diethers are also suitable to be used as external donors. In the case that the internal donor is one of the said 1,3-diethers, the external donor can be omitted.

The catalysts may be precontacted with small quantities of olefin (prepolymerization), maintaining the catalyst in suspension in a hydrocarbon solvent, and polymerizing at temperatures from room to 60° C., thus producing a quantity of polymer from 0.5 to 3 times the weight of the catalyst.

The operation can also take place in liquid monomer, producing, in this case, a quantity of polymer up to 1000 times the weight of the catalyst.

Other catalysts that may be used are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the fractions b) and c).

The above mentioned sequential polymerization process for the production of the heterophasic polyolefin composition (II) comprises at least two stages, where in the first stage propylene is polymerized, optionally in the presence of ethylene and/or said α-olefins as comonomer(s), to form fraction a), and in the subsequent stage(s) mixtures of ethylene/propylene and/or an other α-olefin and optionally a diene are polymerized to form fractions b) and c). The polymerization processes are carried out in either liquid, gas, or liquid/gas phase. The reaction temperature in the various stages of polymerization can be equal or different, and generally ranges from 40 to 90° C., preferably from 50 to 80° C. for fraction a), and from 40 to 60 ° C. for fractions b) and c).

Examples of sequential polymerization processes are described in published European patent application EP-A-0472946.

The MFR values, measured according to ASTM D1238, at 230° C./2.16 kg of the heterophasic composition (II) is generally from 0.1 to 100 g/10 min, preferably from 0.2 to 50 g/10 min.

The desired MFR values for the butene-1 polymer component (I) and the heterophasic composition (II) to be used in the mixtures of the invention can be obtained directly in polymerization, by adequately regulating the molecular weight regulator (hydrogen, for example), or can be obtained by subjecting said polymer components or compositions to visbreaking. Said polymer chain scissioning or visbreaking is carried out by using well known techniques. One of them consists of using peroxides which are added in sufficient quantities to the polymer composition to provide the desired degree of visbreaking, upon heating, generally in an extruder.

The peroxides which are most conveniently used in the polymer visbreaking process have a decomposition temperature preferably ranging from 150° C. to 250° C. Examples of said peroxides are di-tert-butyl peroxide, dicumyl peroxide, 2,5-dimethyl-2,5-di(tert-butylperoxy)hexyne and Luperox 101 2,5-dimethyl-2,5-di(tert-butylperoxy)hexane, all of which are commercially available.

The quantity of peroxide necessary for the visbreaking process preferably ranges from 0.001 to 1.5% by weight of the polymer, more preferably from 0.002 to 0.6%.

In the mixture of the present invention, the amount of polymer composition (B) generally is from 2 to 30% by weight with respect to the total weight of the mixture, preferably from 3 to 20%.

As previously mentioned, the mixture of the present invention can also contain one or more fillers.

Such fillers, hereinafter identified as component (C), are preferably selected from the group consisting of calcium carbonate, limestone, talc, graphite, carbon black, silica and clay.

Typically the amount of filler(s) (C) in the mixture of the present invention is from 5 to 50% by weight with respect to the total weight of the mixture, preferably from 10 to 35% by weight.

Moreover the mixture of the present invention may contain at least one other type of polymer, hereinafter identified as component (D), in addition to the polymer composition (B).

For example, the mixture may comprise, as component (D), one or more olefinic or nonolefinic polymers. In particular, such additional polymers (D) can be selected from the group consisting of amorphous or atactic polymers (in particular amorphous polyolefins such as amorphous polypropylene), styrene-butadiene-styrene (SBS) copolymers, ethylene polyvinyl acetate, low or high density polyethylene, and other polyolefins, in particular isotactic polypropylene and ethylene-propylene random copolymers.

Generally the said additional polymers (D) are added, for example, in quantities greater than or equal to 0.5%, preferably from 0.5 to 30%, more preferably from 0.5 to 23% by weight with respect to the weight of the mixture. Even when the said additional polymers are present, the total quantity of polymers in the bituminous mixture is less than or equal to 40%, preferably 25% by weight with respect to the total weight of the mixture.

Particularly preferred additional polymers are amorphous or atactic polyolefins, also called amorpohous poly-alpha-olefins (APAO).

Examples of amorphous or atactic polyolefins (homopolymers or copolymers), are the by-products of polymerization reactions with Ziegler-Natta catalysts for the production of isotactic polymers, like polypropylene.

Other kinds of suitable amorphous or atactic polyolefins can be obtained with homogeneous catalysts based on Zr, Ti, or Hf metallocenes, and with alkylalumoxanes as cocatalysts.

Examples of such polyolefin materials and their mixtures with bitumens are disclosed in WO9731065.

Thus the mixture of the present invention can comprise from 70 to 98% by weight, preferably from 80 to 97% of bitumen (A) and from 2 to 30% by weight, preferably from 3 to 20% of polymer composition (B), with respect to the total weight of the mixture.

In the presence of the additional component, the mixture of the present invention can preferably comprise from 40 to 80% by weight, preferably from 50 to 70% by weight of bitumen (A), from 2 to 30% by weight of polymer composition (B), from 5 to 50% by weight of one or more fillers (C) and/or from 0.5 to 30% by weight of one or more additional polymers (D), all said amounts being referred to the total weight of the mixture.

The polymer composition (B) and all the other described components are incorporated in the bitumen according to known methods.

For example it is possible to blend the components in mixers usually employed in the art, as Banbury mixers or screw extruders. Generally the polymer composition (B) and the other optional polymer components are mixed with the bitumen at temperatures higher than their melting or softening point.

Preferably the mixing process is carried out at a temperature from 150 to 250° C.

The composition (B) is preferably prepared in advance, by blending the components (I) and (II) at temperatures higher than their melting or softening point, thus preferably at a temperature 150 to 250° C. Also in this case it is possible to blend the components in mixers usually employed in the art, as Banbury mixers or screw extruders.

The fillers are preferably added when the polymer composition (B) and the other optional polymer components are already dispersed in the bitumen.

The mixtures of the present invention can be used in the commonly known applications of polymer modified bitumens, in particular for road paving and, more preferably, in the preparation of roofing membranes.

The following examples are given in order to illustrate, but not limit the present invention.

The data reported in above description and in the examples, relating to the following polymer properties, are determined according to the methods indicated below.

| Property | Method |
| --- | --- |
| Melt flow rate (MFR): | ASTM D1238, at 190° C./2.16 kg for butene polymers; at 230° C./2.16 kg for the heterophasic polyolefin composition and for polypropylene; |
| Ethylene and propylene content: | by IR spectroscopy. |

Xylene Soluble and Insoluble Fractions (for the Heterophasic Polyolefin Composition and for Polypropylene)

2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

The properties of the polymer composition/bitumen mixtures are determined as follows.

| Property | Method |
| --- | --- |
| Ring & Ball (R&B): | EN 1427 |
| Flow resistance: | EN 1110 |
| Penetration: | EN 1426 at 25° C. and at 60° C.; |
| Cold bend: | EN 1109 |
| Viscosity: | ASTM D 4402 | a) Materials used

Bitumen 1: a bitumen having penetration of 174 dmm (decimillimeters), measured at 25° C., and R&B of 37.5° C.

Bitumen 2: a bitumen having penetration of 140 dmm, measured at 25° C., and R&B of 42.5° C.

PB 1: butene-1 copolymer containing 1.02% by weight of ethylene and 5.9% by weight of propylene, having MFR of 3.19 g/10 min.

PB 2: butene-1 copolymer containing 3.14% by weight of ethylene, having MFR of 2.72 g/10 min.

HECO: heterophasic polyolefin composition obtained by sequential polymerization using a high-yield, highly stereospecific Ziegler-Natta catalyst, followed by visbreaking, and comprising:

a) 35% of crystalline copolymer of propylene with 3.5% by weight of ethylene;

b) 2% by weight of a copolymer fraction containing ethylene, insoluble in xylene at room temperature;

c) 63% by weight of a propylene-ethylene copolymer fraction, containing 27% by weight of ethylene, soluble in xylene at room temperature.

As mentioned, before preparing the bitumen-polymer composition mixture, such heterophasic polyolefin composition is subjected to a visbreaking process, thus obtaining the final heterophasic polyolefin composition (II). The visbreaking is carried out by adding 450 ppm of a peroxide, namely 2,5-dimethyl-2,5-di(tert-butylperoxy)hexane. The addition of peroxide to the polymer composition occurs by mixing using a Werner co-rotating twin-screw extruder with a L/D=20/30. The extrusion takes place at 100-200 rpm and a temperature of 170° C.-210° C. The extruded polymer strand is then cooled and cut into pellets in water. The MFR values after visbreaking isnd 7.2 g/10 min.

CaCO$_3$: calcium carbonate (filler).

APAO: propylene-rich amorphous polyalphaolefin, having molecular weight Mn/Mw 18.800/85.000, sold by Degussa with the trademark Vestoplast 891.

IPP: isotactic polypropylene having MFR of 10 g/10 min. and isotacticity index, measured as fraction insoluble in xylene at room temperature, of 98%.

EXAMPLES 1 to 4

The polymer composition (B) is prepared by blending in the molten state the above described HECO and PB 1 or PB 2 in the proportions reported in Table 1, thus obtaining compositions (B 1) and (B 2). The blending step is carried out by extrusion as described above for the preparation of the pellets of HECO.

TABLE 1

|  | Composition | |
| --- | --- | --- |
|  | (B 1) | (B 2) |
| HECO (weight %) | 95 | 95 |
| PB 1 (weight %) | 5 | — |
| PB 2 (weight %) | — | 5 |

The mixtures of polymer composition (B) with bitumen and with the other components are obtained in a vessel heated at 180° C., equipped with a standard mixing unit. The CaCO$_3$ filler is introduced only when the complete dispersion of the polymers in the bitumen is obtained.

Each final mixture is poured into a proper mould to obtain the test specimens of 4 mm thickness, without reinforcement.

The viscosity is measured at the end of the mixing step.

The composition of the so obtained mixtures is reported in Table 2, the properties of such mixtures are reported in Table 3.

Comparative Examples 1 to 4

Mixtures with bitumen are prepared as in the preceding examples, but using the materials reported in Table 2, in the absence of the polymer composition (B). Such materials are directly added to the bitumen, without previous blending steps.

The properties of such mixtures are reported in Table 3.

TABLE 2

|  | Example | | | | | | | |
|---|---|---|---|---|---|---|---|---|
|  | 1 | 2 | 3 | 4 | C. 1 | C. 2 | C. 3 | C. 4 |
| Bitumen 1 | 64 | 64 | — | — | 64 | 64 | — | — |
| Bitumen 2 | — | — | 64 | 64 | — | — | 64 | 64 |
| Composition (B 1) | 6 | — | 6 | — | — | — | — | — |
| Composition (B 2) | — | 6 | — | 6 | — | — | — | — |
| APAO | 8.4 | 8.4 | 8.4 | 8.4 | 8.4 | 14.4 | 8.4 | 14.4 |
| IPP | 1.6 | 1.6 | 1.6 | 1.6 | 1.6 | 1.6 | 1.6 | 1.6 |
| CaCO$_3$ | 20 | 20 | 20 | 20 | 20 | 20 | 20 | 20 |
| HECO | — | — | — | — | 6 | — | 6 | — |

Note:
C. = Comparison Example

TABLE 3

|  | Example | | | | | | | |
|---|---|---|---|---|---|---|---|---|
|  | 1 | 2 | 3 | 4 | C. 1 | C. 2 | C. 3 | C. 4 |
| R&B (° C.) | 155 | 156 | 155 | 155 | 155 | 153 | 154 | 152 |
| Flow resistance (° C.) | >140 | >140 | >140 | >140 | >140 | >140 | >140 | 130 |
| Penetration at 25° C. (dmm) | 30 | 27 | 30 | 26 | 27 | 40 | 27 | 33 |
| Penetration at 60° C. (dmm) | 103 | 105 | 93 | 95 | 101 | 155 | 96 | 135 |
| Viscosity at 180° C. (cps) | 4840 | 5100 | 4520 | 5900 | 6880 | 4080 | 7120 | 3840 |
| Cold bend (° C.) | −21 | −22 | −20 | −19 | −20 | −22 | −18 | −18 |
| Cold bend after ageing at 80° C. for 7 days (° C.) | −18 | −19 | −18 | −17 | −18 | −20 | −16 | −12 |

The invention claimed is:

1. A mixture comprising a bitumen (A), and 2 to 30% by weight of a polymer composition (B) comprising the following components, all percent amounts being by weight:
   I) from 1 to 30% of a crystalline or semicrystalline butene-1 polymer having an isotactic index of at least 60% and a Melt Flow Rate (MFR), measured according to ASTM D1238, at 190° C./2.16 kg, from 0.1 to 1000 g/10 min.; and
   II) from 70 to 99% of a heterophasic polyolefin composition comprising the following polymer fractions:
      a) from 4 to 45% of a propylene homopolymer, or a copolymer of propylene with ethylene or a CH$_2$=CHR α-olefin, where R is a C$_2$-C$_8$ alkyl radical, or a copolymer of propylene with ethylene and said CH$_2$=CHR α-olefin, said copolymers containing 85% or more of propylene, and having a fraction insoluble in xylene at room temperature greater than 80%;
      b) from 0 to 20% of a copolymer fraction containing ethylene and propylene, insoluble in xylene at room temperature; and
      c) from 40 to 95% of a copolymer of ethylene with propylene or a CH$_2$=CHR α-olefin, where R is a C$_2$-C$_8$ alkyl radical, and optionally minor quantities of a diene, or a copolymer of ethylene with propylene and said α-olefin, said copolymers containing ethylene in a quantity lower than 40% and being soluble in xylene at room temperature.

2. The mixture of claim 1, comprising from 40 to 80% by weight of bitumen (A), from 2 to 30% by weight of polymer composition (B), from 5 to 50% by weight of one or more fillers (C) and/or from 0.5 to 30% by weight of one or more additional polymers (D), all said amounts being referred to the total weight of the mixture.

3. The mixture of claim 2, wherein the fillers (C) are selected from the group consisting of calcium carbonate, limestone, talc, graphite, carbon black, silica and clay.

4. The mixture of claim 2, wherein the additional polymers (D) are selected from the group consisting of amorphous or atactic polyolefins, styrene-butadiene-styrene (SBS) copolymers, ethylene polyvinyl acetate, low or high density polyethylene, isotactic polypropylene and ethylene-propylene random copolymers.

5. A roofing membrane comprising a mixture comprising:
   (A) bitumen, and
   (B) 2 to 30% by weight of a polymer composition comprising: the following components, all percent amounts being by weight:
   (I) from 1 to 30% by weight, based on the total weight of the polymer composition, of a crystalline or semicrystalline butene-1 polymer having an isotactic index of at least 60% and a Melt Flow Rate (MFR), measured according to ASTM D1238, at 190° C./2.16 kg, from 0.1 to 1000 g/10 min.; and
   (II) from 70 to 99% by weight, based on the total weight of the polymer composition, of a heterophasic polyolefin composition comprising the following polymer fractions:
      a) from 4 to 45% by weight, based on the total weight of the heterophasic polymer composition, of a propylene homopolymer, or a copolymer of propylene with ethylene or a CH$_2$=CHR α-olefin, where R is a C$_2$-C$_8$ alkyl radical, or a copolymer of propylene with ethylene and said CH$_2$=CHR α-olefin, said copolymers containing 85% or more of propylene, and having a fraction insoluble in xylene at room temperature greater than 80%;
      b) from 0 to 20% by weight, based on the total weight of the heterophasic polymer composition, of a copolymer fraction containing ethylene and propylene, insoluble in xylene at room temperature; and
      c) ) from 40 to 95% by weight, based on the total weight of the heterophasic polymer composition, of a copolymer of ethylene with propylene or a CH$_2$=CHR α-olefin, where R is a C$_2$-C$_8$ alkyl radical, and optionally minor quantities of a diene, or a copolymer of ethylene with propylene and said α-olefin, said copolymers containing ethylene in a quantity lower than 40% and being soluble in xylene at room temperature.

* * * * *